United States Patent
Lusky et al.

(10) Patent No.: US 8,831,046 B2
(45) Date of Patent: Sep. 9, 2014

(54) TIME SYNCHRONIZATION IN WIRELESS COMMUNICATION NETWORKS

(75) Inventors: Itay Lusky, Hod Hasharon (IL); Yigal Bitran, Hod Hasharon (IL)

(73) Assignee: Altair Semiconductor Ltd., Hod Hasharon (IL)

(*) Notice: Subject to any disclaimer, the term of this patent is extended or adjusted under 35 U.S.C. 154(b) by 126 days.

(21) Appl. No.: 13/426,663

(22) Filed: Mar. 22, 2012

(65) Prior Publication Data

US 2012/0177068 A1 Jul. 12, 2012

Related U.S. Application Data

(63) Continuation of application No. 12/238,109, filed on Sep. 25, 2008, now Pat. No. 8,165,168.

(60) Provisional application No. 60/997,333, filed on Oct. 1, 2007.

(51) Int. Cl.
*H04J 3/06* (2006.01)
*H04B 7/00* (2006.01)
*H04W 56/00* (2009.01)
*H04W 28/04* (2009.01)

(52) U.S. Cl.
CPC .......... *H04W 56/0005* (2013.01); *H04W 28/04* (2013.01)
USPC .......................................... 370/509; 455/502

(58) Field of Classification Search
CPC .. H04W 72/082; H04W 56/00; H04W 56/001
USPC ......... 370/503, 507, 508, 509, 350, 328, 329, 370/330, 332, 331, 336, 342, 296, 370/203–210; 455/439, 443, 450, 452.2, 455/524, 525, 134, 135, 114.2, 226.3
See application file for complete search history.

(56) References Cited

U.S. PATENT DOCUMENTS

| | | | |
|---|---|---|---|
| 7,796,698 B2 * | 9/2010 | Koorapaty et al. | 375/260 |
| 8,077,627 B2 * | 12/2011 | Chang et al. | 370/252 |
| 8,165,168 B2 * | 4/2012 | Lusky et al. | 370/503 |
| 8,428,158 B2 * | 4/2013 | Maltsev et al. | 375/260 |
| 2007/0280096 A1 * | 12/2007 | Yanover et al. | 370/201 |
| 2008/0002613 A1 | 1/2008 | Beser | |
| 2008/0051095 A1 | 2/2008 | Chang et al. | |
| 2008/0159439 A1 | 7/2008 | Bitran | |

(Continued)

OTHER PUBLICATIONS

Laine, J., "Interference Estimation in a Multicellular OFDMA Environment", Master Thesis, Department of Signals, Sensors and Systems, Royal Institute of Technology, Stockholm, Sweden, Jul. 2004.

(Continued)

*Primary Examiner* — Hanh N Nguyen
(74) *Attorney, Agent, or Firm* — D. Kligler IP Services Ltd.

(57) ABSTRACT

A communication terminal includes a Radio Frequency (RF) unit and a baseband processor. The baseband processor is coupled to receive from the a servicing base station (BS) information indicating an extent of synchronization between the servicing BS and at least one other BS of the wireless communication network, and to process received signals, responsively to the extent of the synchronization specified in the received information, so as to cancel interference caused to the signals received from the servicing BS by signals transmitted by the at least one other BS.

31 Claims, 3 Drawing Sheets

(56) References Cited

U.S. PATENT DOCUMENTS

2008/0187031 A1* 8/2008 Ko et al. ............... 375/227
2009/0034459 A1   2/2009 Shousterman et al.
2014/0092882 A1* 4/2014 Sankar et al. .......... 370/336

OTHER PUBLICATIONS

IEEE Standard 802.16 for Local and metropolitan area networks, "Part 16: Air Interface for Fixed Broadband Wireless Access Systems", Revision of IEEE Standard 802.16-2001, IEEE Computer Society and IEEE Microwave Theory and Techniques Society, USA, Oct. 1, 2004.

P802.16Rev2/D6 (Revision of IEEE Standard 802.16-2004) "Part 16: Air Interface for Fixed Broadband Wireless Access Systems", IEEE Computer Society and IEE Microwave Theory and Techniques Society, USA, Jul. 2008.

U.S Appl. No. 12/238,109 Official Action dated Oct. 19, 2011.

U.S Appl. No. 12/238,109 Official Action dated May 3, 2011.

Bachu et al., "Linear Interference Cancellation for Downlink MAP Reception in IEEE 802.16e", 17th Annual IEEE International Symposium on Personal, Indoor and Mobile Radio Communications (PIMRC'06), Helsinki, Finland, Sep. 11-14, 2006.

Tang et al., "Space-Time Interference Cancellation in MIMO-OFDM Systems", IEEE Transactions on Vehicular Technology, vol. 54, No. 5, pp. 1802-1816, Sep. 2005.

* cited by examiner

TIME SYNCHRONIZATION IN WIRELESS COMMUNICATION NETWORKS

CROSS-REFERENCE TO RELATED APPLICATIONS

This application is a continuation of U.S. patent application 12/238,109, filed Sep. 25, 2008, which claims the benefit of U.S. Provisional Patent Application 60/997,333, filed Oct. 1, 2007. The disclosures of these related applications are incorporated herein by reference.

FIELD OF THE INVENTION

The present invention relates generally to wireless communication networks, and particularly to methods and systems for synchronization in cellular networks.

BACKGROUND OF THE INVENTION

Some wireless communication networks, and in particular cellular networks, use communication protocols that define frames in time domain. For example, Worldwide Interoperability for Microwave Access (WiMAX) networks may operate in a Time Division Duplex (TDD) or a Frequency Division Duplex (FDD) mode. Both of these modes transmit data in time frames. In TDD operation, uplink (UL) and downlink (DL) transmission is carried out on the same frequency while alternating between uplink and downlink subframes. In FDD operation, uplink and downlink subframes are transmitted on separate frequencies.

The original WiMAX standard, IEEE 802.16, specified WiMAX in the 10-66 GHz range. More recently, IEEE 802.16a added support for the 2-11 GHz range, and IEEE 802.16e (approved as IEEE 802.16-2005 and amended as IEEE 802.16-REV2) extended WiMAX to mobile applications. In the context of the present patent application and in the claims, the term "802.16" is used to refer collectively to the original IEEE 802.16 standard and all its variants and extensions, unless specifically noted otherwise.

The WiMAX standard defines both TDD and FDD frame structures. In TDD, the frame structures alternate between DL and UL subframes, whereas in FDD transmission in each direction is carried out on a separate frequency. In either TDD or FDD operation, the frames may be partitioned into zones, which correspond to different sub-channelization schemes. Section 8.3.4.1 of the IEEE 802.16-REV2 standard addresses the FDD frame structure. Section 8.3.4.2 of the standard addresses the TDD frame structure and its division into zones.

SUMMARY OF THE INVENTION

An embodiment of the present invention provides a communication terminal, including:

a Radio Frequency (RF) unit, which is operative to receive signals from a Base Station (BS) of a wireless communication network using a communication protocol that defines time frames divided in a time domain into zones, such that each zone corresponds to a respective communication mode between the BS and the terminal and occupies respective time intervals within the frames; and a baseband processor, which is coupled to receive from the BS via the RF unit synchronization information indicating whether the time intervals allocated to at least a given zone by the BS and by at least one other BS of the wireless communication network are synchronized with one another, and to process the signals received from the BS so as to cancel, responsively to the synchronization information, interference caused to the signals by the at least one other BS.

In some embodiments, the communication protocol conforms to an IEEE 802.16 standard. The communication protocol may include one of a Time Division Duplex (TDD) protocol and a Frequency Division Duplex (FDD) protocol. The given zone may include at least one zone type selected from a group of types consisting of Adaptive Modulation and Coding (AMC), Full Usage of Subchannels (FUSC), Partial Usage of Subchannels (PUSC), PUSC-Space Time Coding (PUSC-STC), Adaptive Modulation and Coding and STC (AMC-STC), FUSC-STC and an uplink special zone.

The baseband processor may be coupled to receive the synchronization information periodically in at least some of the time frames, in a system message, and/or upon initiating communication with the BS. In a disclosed embodiment, the at least one other BS includes one or more nearest-neighbors of the BS in the wireless communication network.

In an embodiment, when the synchronization information indicates that the time intervals allocated to the given zone by the BS and by the at least one other BS are synchronized with one another, the baseband processor is coupled to compute an estimate of the interference to be used for interference cancellation in the given zone within a first time frame, and to apply a link adaptation process using the estimate in a second time frame later than the first time frame.

In another embodiment, when the synchronization information indicates that the time intervals allocated to the given zone by the BS and by the at least one other BS are synchronized with one another, the baseband processor is coupled to receive from the BS first pilot symbols in the given zone and to receive from the at least one other BS second pilot symbols in the given zone such that the first and second pilot symbols overlap, and to estimate the interference by processing the overlapping first and second pilot symbols.

In yet another embodiment, the synchronization information indicates that the time intervals allocated to the given zone by the BS and by the at least one other BS are synchronized with one another with regard to at least one zone configuration attribute. The zone configuration attribute may be selected from a group of attributes consisting of a zone type and a frequency reuse.

In some embodiments, the baseband processor is coupled to measure a Carrier to Interference and Noise ratio (CINR) of the received signals, to compute a reported value of the CINR responsively to the synchronization information, and to send the reported value of the CINR to the BS. In an embodiment, the baseband processor is coupled to send a capabilities message to the BS, so as to indicate to the BS whether the terminal supports an interference cancellation mechanism that uses the synchronization information.

There is additionally provided, in accordance with an embodiment of the present invention, a Base Station (BS), including:

a Radio Frequency (RF) unit, which is operative to transmit signals to a communication terminal using a communication protocol that defines time frames divided in a time domain into zones, such that each zone corresponds to a respective communication mode between the BS and the terminal and occupies respective time intervals within the frames; and a baseband processor, which is coupled to produce synchronization information indicating whether the time intervals allocated to at least a given zone by the BS and by at least one other BS are synchronized with one another and to send the synchronization information via the RF unit to the communication terminal.

There is also provided, in accordance with an embodiment of the present invention, a wireless communication network, including:

one or more first base stations, which are located in a predefined geographical region; and one or more second base stations, which are located outside the predefined geographical region, wherein the first and second base stations are coupled to communicate with communication terminals in accordance with a communication protocol that defines time frames divided in a time domain into zones, such that each zone corresponds to a respective communication mode and occupies respective time intervals within the frames, wherein the time intervals allocated to at least a given zone by the first base stations are synchronized with one another and are not synchronized with the time intervals allocated to the given zone by the second base stations, and wherein each base station from among the first base stations is coupled to transmit to the terminals synchronization information indicating whether the time intervals allocated to the given zone by the base station and by at least one neighboring base station are synchronized with one another.

In some embodiments, a given base station that is located in a perimeter of the predefined geographical region is coupled to transmit the synchronization information indicating that the time intervals allocated to the given zone by the at given base station and by the base stations that neighbor the given base station are not synchronized with one another.

There is further provided, in accordance with an embodiment of the present invention, a method for communication, including:

receiving signals from a Base Station (BS) of a wireless communication network using a communication protocol that defines time frames divided in a time domain into zones, such that each zone corresponds to a respective communication mode between the BS and the terminal and occupies respective time intervals within the frames;

receiving from the BS synchronization information indicating whether the time intervals allocated to at least a given zone by the BS and by at least one other BS of the wireless communication network are synchronized with one another; and processing the signals received from the BS so as to cancel, responsively to the synchronization information, interference caused to the signals by the at least one other BS.

There is additionally provided, in accordance with an embodiment of the present invention, a method for communication, including:

transmitting signals from a Base Station (BS) to a communication terminal using a communication protocol that defines time frames divided in a time domain into zones, such that each zone corresponds to a respective communication mode between the BS and the terminal and occupies respective time intervals within the frames;

producing synchronization information indicating whether the time intervals allocated to at least a given zone by the BS and by at least one other BS are synchronized with one another; and sending the synchronization information to the communication terminal, so as to enable the terminal to cancel, responsively to the synchronization information, interference caused to the signals by the at least one other BS.

There is also provided, in accordance with an embodiment of the present invention, a method for communication, including:

operating one or more first base stations, which are located in a predefined geographical region, and one or more second base stations, which are located outside the predefined geographical region, so as to communicate with communication terminals in accordance with a communication protocol that defines time frames divided in a time domain into zones, such that each zone corresponds to a respective communication mode and occupies respective time intervals within the frames;

synchronizing the time intervals allocated to at least a given zone by the first base stations with one another, such that the time intervals allocated to the given zone by the first base stations are not synchronized with the time intervals allocated to the given zone by the second base stations; and transmitting from each base station from among the first base stations to the terminals synchronization information indicating whether the time intervals allocated to the given zone by the base station and by at least one neighboring base station are synchronized with one another.

The present invention will be more fully understood from the following detailed description of the embodiments thereof, taken together with the drawings in which:

DETAILED DESCRIPTION OF EMBODIMENTS

Overview

Figure 1:
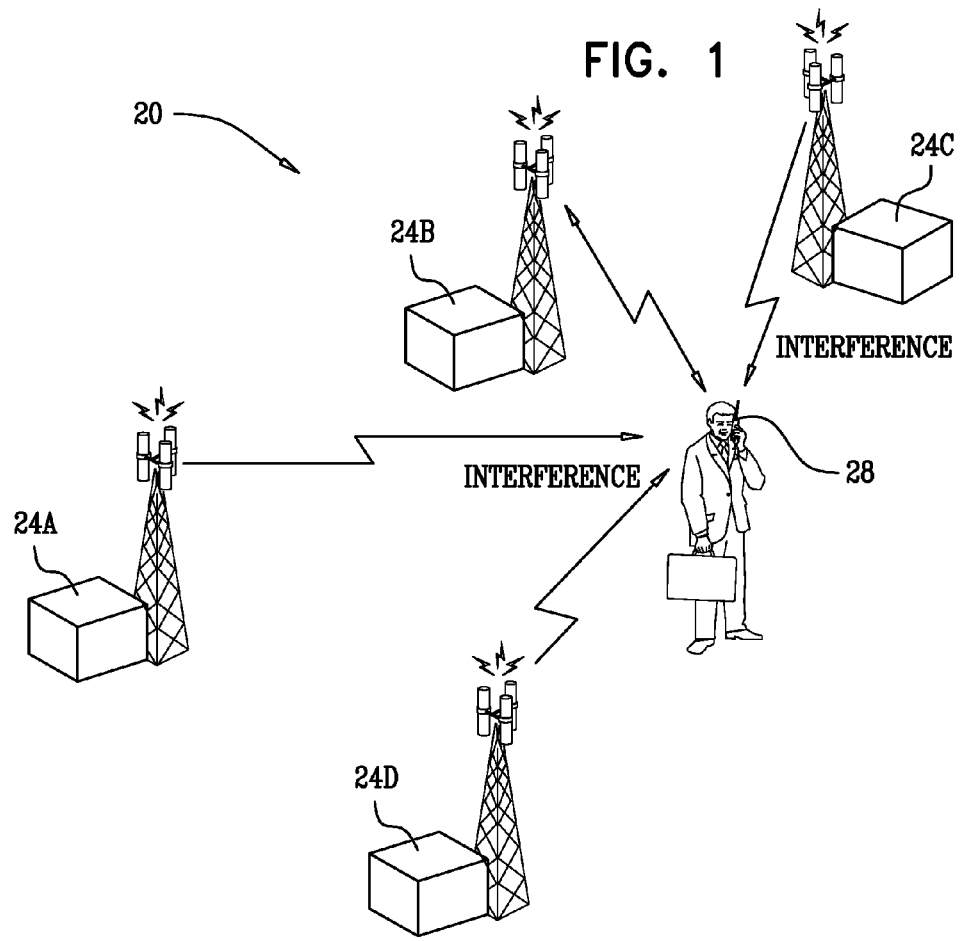
FIG. 1 is a block diagram that schematically illustrates a cellular communication network, in accordance with an embodiment of the present invention.

In IEEE 802.16 networks, Base Stations (BSs) communicate with terminals (Mobile Stations—MS) in time frames that alternate between downlink (DL) and uplink (UL) transmission. Each frame is divided into DL and UL subframes. In TDD frame structure, the partitioning between UL and DL subframes is in time domain. In FDD frame structure, on the other hand, the partitioning is in frequency domain.

In some network configurations, which may operate in either TDD or FDD, the DL and UL subframes are further divided into zones that correspond to specific communication modes between the BS and MSs. Each communication mode (and thus each zone) is characterized by a certain sub-channelization scheme, i.e., a scheme of allocating time and frequency resources to MSs. In particular, each sub-channelization scheme specifies the time and frequency allocations for pilot symbols.

At any given point in time, each MS communicates with a given BS, which is referred to as the Serving BS (SBS) of the MS. In many cases, however, the MS receives signals not only from its SBS, but also from other BSs in the network. Such signals are regarded as interference, and may degrade the reception performance of the MS considerably. MSs often deploy various techniques for canceling interference from neighboring BSs. Many of these techniques estimate and cancel the interference by performing measurements on the pilot symbols.

The interference estimation and cancellation performance of the MS often depends on whether or not the SBS and the interfering BSs switch from one zone to another in a synchronized manner. When the zone types and zone switching times are synchronized among the SBS and interfering BSs, the pilot symbols transmitted by the SBS and by the interfering BSs overlap. Thus, the MS will receive the pilot symbols from the SBS and from the interfering BSs at the same times and on the same frequencies.

Receiving overlapping zones and pilot symbols from different BSs is important to the interference cancellation process performed by the MS. For example, interference properties often change from one zone to another. If it known that interference properties are stable along a given zone, interference cancellation can be performed more efficiently. Additionally, the fact that both the SBS and the interfering BSs transmit pilot symbols at specific times and frequencies is helpful for characterization of interference properties that are subsequently used for interference cancellation. Moreover, in order to use interference cancellation techniques reliably and apply them also to link adaptation (i.e., to adapt the modulation and coding scheme according to channel conditions), it is important to know that the MS's capability to characterize and mitigate interference is stable from one frame to another. In other words, it is important to know that the estimated MS performance capability in one frame is likely to predict the achievable performance in following frames. On the other hand, when the zone types or zone switching times are not synchronized among the different BSs, the MS is likely to receive pilot symbols from different BSs at different frequencies or times. In this case, it will be difficult for the MS to estimate and cancel the interference reliably.

Embodiments of the present invention that are described herein provide methods and systems for notifying MSs as to the zone synchronization status of the SBS and other BSs. Although the embodiments described herein refer to IEEE 802.16 networks, the disclosed methods and systems can be used with various other communication protocols and network types.

In some embodiments, a SBS transmits signals to a MS that include synchronization information, which notifies the MS whether (and/or to what extent) the SBS is synchronized with other BSs with regard to zone types and zone switching times. Different levels of zone synchronization may be implemented. For example, the SBS may be synchronized with the other BSs with regard to the start and end times of DL and UL subframes and of the zones within the subframes, zone configuration attributes such as the zone types, the frequency reuse in each zone, the time/frequency locations of pilot symbols within each zone, or with regard to any suitable subset of these attributes or other transmission properties defined in the IEEE 802.16 standard. Several exemplary synchronization levels are described below.

The MS extracts the synchronization information from the signals transmitted by the SBS and cancels, responsively to the synchronization information, interference caused to the SBS signals by the at least one other BS. In some embodiments, the MS selects, based on the synchronization information, whether to activate a first interference cancellation mechanism that assumes zone synchronization or a second mechanism that does not assume zone synchronization. Alternatively, the MS may support a single interference cancellation mechanism that accepts the synchronization information as input. In either case, canceling the interference using zone synchronization information may improve the MS's interference cancellation performance considerably.

The synchronization information can be transmitted to the MSs periodically, e.g., on a frame-by-frame basis, or occasionally in system messages (e.g., status messages), or even only once during link establishment. Synchronization may be applied to only a subset of the zones, in which case the synchronization information notifies the MSs which zones are synchronized among the BSs and which are not.

In some embodiments, zone synchronization is applied in specific geographical regions of the network, rather than across the entire network. In other words, one or more geographical regions can be defined, such that the BSs in each region are zone-synchronized with one another, but BSs in different regions are not necessarily zone-synchronized. This technique enables the network operator to apply flexible tradeoffs between network limitations, which are imposed by the synchronized zones, and the capacity benefit achieved as a result of interference cancellation capabilities.

System Description

FIG. 1 is a block diagram that schematically illustrates a cellular communication network 20, in accordance with an embodiment of the present invention. Network 20 comprises multiple Base Stations (BSs) 24, which communicate with mobile communication terminals 28. In the present example, network 20 comprises a WiMAX™ network operating in accordance with the IEEE 802.16 standard (in either TDD or FDD). Alternatively, however, the network may operate in accordance with any other suitable standard or protocol that uses different transmission characteristics along the time domain (such as the zones defined in the IEEE 802.16 standard).

Terminal 28 may comprise, for example, a cellular phone, a wireless-enabled Personal Digital Assistant (PDA) or mobile computer, or any other suitable type of communication or computing device having wireless communication capabilities. The terminals are also referred to as Mobile Stations (MSs).

At a given point in time, each terminal communicates with a given BS, which is referred to as the Serving BS (SBS) of the terminal. In many cases, however, the terminal may receive signals not only from its SBS but also from other BSs in the network. Such signals are regarded as interference, and may degrade the reception performance of the terminal considerably. In the example of FIG. 1, terminal 28 communicates with BS 24B, but is subject to interference from three other BSs 24A, 24C and 24D.

The level and characteristics of the interference depend on a multitude of factors, such as the distance of the terminal from the different BSs, Line of Sight (LOS) conditions, and the communication protocol and/or frequency planning used in the network. Interference is especially severe when the SBS and the interfering BSs transmit on the same carrier frequency.

In particular, the interference characteristics may depend on the synchronization (or lack of synchronization) between the SBS and the interfering BSs. Many communication terminals employ interference mitigation techniques for reducing or canceling interference from other BSs. Some of these techniques make use of the fact that the transmissions of the interfering BSs are time-synchronized with the transmissions of the SBS, as described above. Generally speaking, interference estimation and cancellation techniques that assume synchronization are more effective than techniques that do not rely on synchronization.

Embodiments of the present invention that are described herein provide improved methods and systems for synchronization and interference cancellation in wireless networks. As will be explained in detail further below, terminal 28 receives from the SBS synchronization information, which indicates whether or not the SBS transmission is synchronized with the transmissions of the other BSs. The terminal applies a suitable interference cancellation mechanism in response to the synchronization information.

Figure 2:
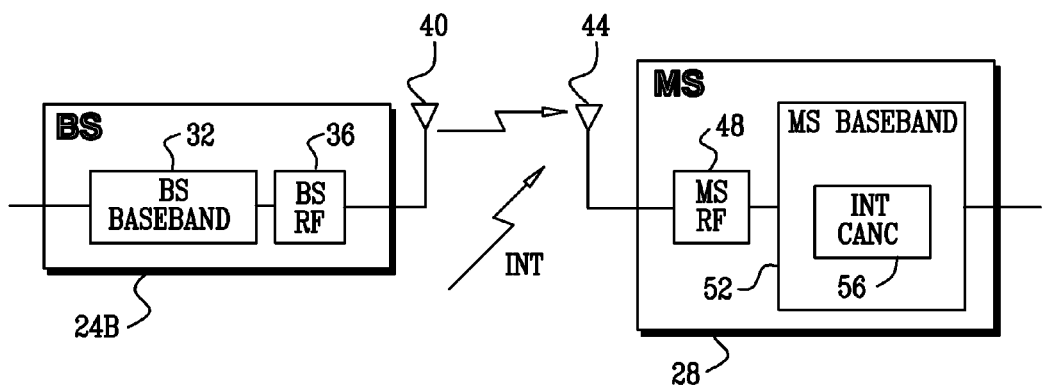
FIG. 2 is a block diagram that schematically illustrates a Base Station (BS) and a Mobile Station (MS) in a cellular communication network, in accordance with an embodiment of the present invention.

FIG. 2 is a block diagram that schematically illustrates BS 24B and MS 28 in network 20, in accordance with an embodiment of the present invention. The BS comprises a BS baseband processor 32, which implements the communication protocol used between the BS and MS. On downlink transmission, the baseband processor produces baseband signals for transmission to the MS. The BS further comprises a BS Radio Frequency (RF) unit 36, which converts the baseband signals produced by processor 32 to RF signals. Unit 36 transmits the RF signals to the MS via a BS antenna 40.

In particular, processor 32 produces synchronization information indicating whether the BS is synchronized with its neighboring BSs, as will be explained below, and transmits the synchronization information to the MS using unit 36. Processor 32 may obtain the synchronization information in various ways. Typically, an operator configures processor 32 with the synchronization information. BS configuration can be performed locally or remotely, such as from an Operations and Maintenance Center (OMC—not shown). Alternatively, processor 32 may communicate with the baseband processors of the other BSs to determine the synchronization information.

On uplink reception, RF unit 36 receives RF signals from the MS and converts them to baseband. Baseband processor 32 processes these baseband signals in accordance with the communication protocol, so as to reconstruct the data transmitted from the MS.

MS 28 comprises a MS antenna 44, which receives the signals transmitted by the SBS. The antenna may also receive undesired interfering signals from other BSs. The signals received by antenna 44 are provided to a MS RF unit 48, which down-converts them to baseband. The baseband signals are then processed by a MS baseband processor 52, so as to reconstruct the data transmitted from the SBS. On uplink transmission, MS baseband processor 52 produces baseband signals, which are converted to RF by RF unit 48 and transmitted to the SBS via antenna 44.

Processor 52 comprises an interference cancellation unit 56, which cancels or reduces the interference caused by signals received from interfering BSs. As will be explained below, baseband processor 52 (and in particular unit 56) receives the synchronization information transmitted from the SBS and applies interference cancellation accordingly.

Interference cancellation unit 56 may apply any suitable interference cancellation technique known in the art. In some embodiments, unit 56 supports multiple interference cancellation techniques. One or more of these techniques assume synchronization between the SBS transmissions and the transmissions of the interfering BSs, while one or more other techniques do not make such an assumption. Unit 56 selects and applies one of the techniques, based on the received synchronization information. Alternatively, unit 56 supports a single interference cancellation technique, which operates differently depending on whether or not synchronization can be assumed. In these embodiments, unit 56 accepts the synchronization information as input and applies interference cancellation accordingly.

Unit 56 may apply any suitable interference cancellation technique known in the art, such as various spatial whitening and linear receiver techniques. For example, Bachu et al., describe linear Minimum Mean Square Error (MMSE) Interference Cancellation (IC) receivers used in IEEE 802.16e terminals, in "Linear Interference Cancellation for Downlink MAP Reception in IEEE 802.16e," $17^{th}$ Annual IEEE International Symposium on Personal, Indoor and Mobile Radio Communications (PIMRC '06), Helsinki, Finland, Sep. 11-14, 2006, which is incorporated herein by reference.

As another example, Tang and Heath describe a two-stage hybrid interference cancellation and equalization framework for interference cancellation in the uplink of Multiple-Input Multiple-Output Orthogonal Frequency Division Multiplexing (MIMO-OFDM) systems in "Space-Time Interference Cancellation in MIMO-OFDM Systems," IEEE Transactions on Vehicular Technology, volume 54, number 5, September, 2005, pages 1802-1816, which is incorporated herein by reference. As yet another example, Laine describes several interference estimation techniques for Orthogonal Frequency Division Multiple Access (OFDMA) systems in "Interference Estimation in a Multicellular OFDMA Environment," M.Sc. Thesis, Dept. of Signals, Sensors and Systems, Royal Institute of Technology, Stockholm, Sweden, July, 2004, which is incorporated herein by reference.

Baseband processors 32 and 52 may be implemented using hardware components, such as Application-Specific Integrated Circuits (ASICs) or Field-Programmable gate Arrays (FPGAs). Alternatively, the baseband processor functionality may be implemented using software running on a suitable processor, or using a combination of hardware and software elements. In some embodiments, processor 32 and 52 comprise general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory.

Zone Synchronization in WiMAX Networks

Figure 3:
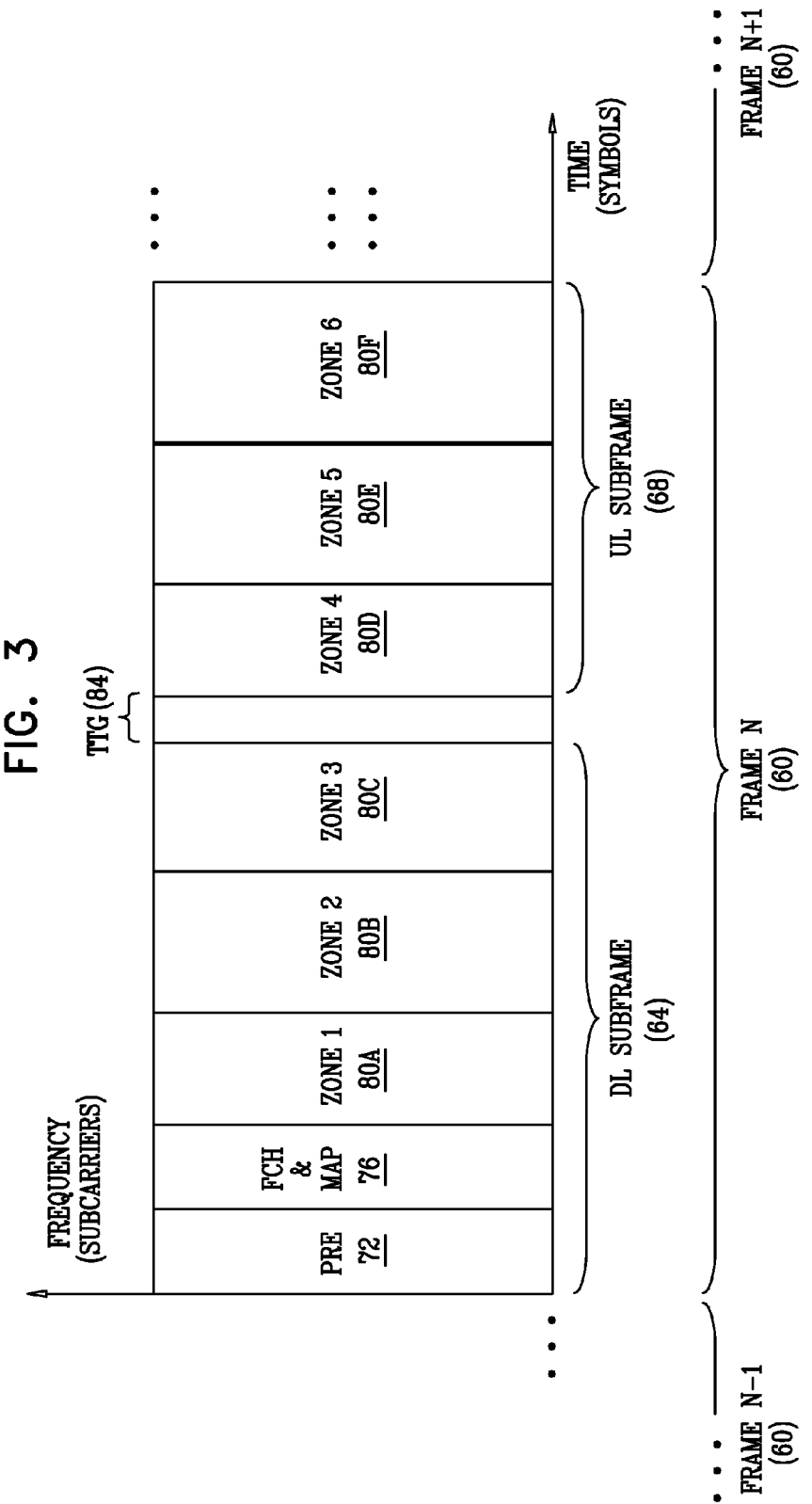
FIG. 3 is a diagram showing a Time Division Duplex (TDD) frame structure used in a WiMAX communication network, in accordance with an embodiment of the present invention.

FIG. 3 is a diagram showing a TDD frame structure used in a WiMAX communication network, in accordance with an embodiment of the present invention. TDD operation, however, is chosen purely by way of example. The methods and systems described herein are similarly applicable to FDD operation. In the present example, the terminal and SBS exchange data in time frames 60. Each frame 60 comprises multiple Orthogonal Frequency Division Multiplexing (OFDM) symbols, which are transmitted over multiple subchannels. Each frame 60 is divided into a downlink (DL) subframe 64 and an uplink (UL) subframe 68. The DL subframe begins with a preamble 72, followed by a Frame Control Header (FCH) and MAP message 76. The FCH and MAP messages specify different attributes of the present frame and/or of the next frame, such as allocations of time/frequency frame resources (symbols and subchannels) to different terminals and services.

The UL and DL subframes are further divided into zones. In the present example, DL subframe 64 is divided into three zones 80A . . . 90C, and UL subframe 68 is divided into three zones 80D . . . 80F. The UL and DL subframes are separated by guard times, which are referred to in WiMAX terminology as transmit/receive transition gap (TTG) and receive/transmit transition gap (RTG). A TTG 84 is shown in the figure.

Each zone specifies a certain communication mode between the SBS and the terminals. The communication modes typically correspond to respective sub-channelization schemes, i.e., different schemes of subdividing the total set of subchannels into subsets and assigning the subsets to terminals. For example, the IEEE 802.16 standard specifies several sub-channelization schemes, such as Adaptive Modulation and Coding (AMC), Full Usage of Subchannels (FUSC), Partial Usage of Subchannels (PUSC), PUSC-Space Time Coding (PUSC-STC), Adaptive Modulation and Coding and STC (AMC-STC) and FUSC-STC. In uplink transmission, the WiMAX standard also defines special zones comprising special symbols on top of the PUSC zone, such as Ranging and Fast-Feedback zones. These zones are referred to herein as uplink special zones.

Alternatively, however, the methods and systems described herein can be used with any other suitable zone type. Thus, each of zones 80A . . . 80F corresponds to a certain operation mode that is characterized by a certain sub-channelization scheme. In general, a certain sub-channelization scheme may appear in multiple zones, i.e., may appear more than once in each frame. The zones need not necessarily have similar sizes, i.e., different zones may occupy different numbers of symbols.

Typically, each sub-channelization scheme defines a certain configuration of pilot symbols within the zone. The pilot symbol configuration may define, for example, the number of pilot symbols in the zone, the time-domain positions (i.e., the specific symbol intervals within the zone) allocated to the pilot symbols, and the frequency-domain positions (i.e., the specific subchannels) allocated to the pilot symbols.

The interference cancellation techniques used by unit 56 of MS 28 often estimate and cancel interference by performing measurements or otherwise processing the pilot symbols received from the SBS and from the interfering BSs. In some implementations, the SBS and the interfering BSs may transmit in mutually-synchronized zones. In other words, the SBS and the interfering BSs transmit using the same sub-channelization scheme at any given time, and the transition from one zone type to another is performed synchronously by the different BSs.

In these implementations, the MS receives pilot symbols from the SBS and from the interfering BSs at the same symbol intervals and on the same subchannels within the zone. As noted above, zone and pilot symbol synchronization can be used to enhance the interference cancellation process performed by the MS. For example, interference properties often change from one zone to another. If it known that interference properties are stable along a given zone, interference cancellation can be performed more efficiently. Additionally, the fact that both the SBS and the interfering BSs transmit pilot symbols at specific times and frequencies is helpful for characterization of interference properties that are subsequently used for interference cancellation. Moreover, in order to use interference cancellation techniques reliably and apply them also to link adaptation, it is important to know that the interference is stable from one frame to another. (Link adaptation typically comprises adapting the modulation and coding in a given zone in order to maximize data throughput at a given target error rate based on channel conditions.)

Thus, when using zone synchronization, interference cancellation performance is improved. In particular, link adaptation can be performed smoothly and reliably, and interference estimation or cancellation that was applied in one frame can be used in a subsequent frame with relatively small variations.

On the other hand, when the sub-channelization scheme is not synchronized between the SBS and the interfering BSs, the time- and frequency-domain positions of the pilot symbols may differ from one BS to another. As a result, the interference cancellation performance of unit 56 may be considerably degraded. Some interference cancellation techniques cannot be used without the assumption of stable interference estimation, and other techniques are usable but provide poor performance.

As can be appreciated from the description above, synchronizing the zone types (sub-channelization schemes) among the different BSs in the network may considerably improve the achievable interference cancellation performance of the MS. In particular, unit 56 of MS 28 can often optimize and improve its interference cancellation performance if it is informed whether or not the SBS and the interfering BSs are zone-synchronized with one another.

Zone synchronization among BSs can be maintained at different levels. As a baseline, the BSs are assumed to be frame-synchronized, i.e., the frame start times are synchronized in the different BSs. In TDD configurations, the BSs may alternate between uplink and downlink subframes in a synchronized manner, but may switch zone types within the uplink or downlink asynchronously. (In FDD configurations, the UL and DL are synchronized by default.) In these embodiments, the UL and DL subframes in the different BSs begin and end at the same OFDM symbol in the frame, but the transitions between zone types within the subframes are not necessarily synchronized.

As another example, the BSs may synchronize both the UL/DL subframes and the internal division into zones. In these embodiments, the UL and DL subframes, as well as the transitions between zone types within the UL/DL subframes, occur in the same OFDM symbols in the different BSs. In these embodiments, zone-synchronized BSs transmit the same zone type (and therefore have the same frequency reuse and transmit pilot symbols at the same times and on the same subchannels) at any given time. The synchronization information transmitted from the SBS to the MS may indicate the level or type of synchronization that is currently in effect.

Further alternatively, some of the zones in the frame may be synchronized between different BSs, while other zones in the frame are not synchronized. For example, zone synchronization may be applied in zones 80A and 80B of frames 60, while zones 80C-80F are not synchronized between different BSs. The synchronization information transmitted by the SBS may indicate which zones are synchronized and which zones are not.

Thus, in the context of the present patent application and in the claims, terms such as "zone synchronization" and "time intervals allocated to a given zone are synchronized" refer to any and all possible levels of synchronization. Such synchronization levels may range from full synchronization of start times, end times and zone types of each zone (and in particular the frequency reuse and time/frequency location of pilot symbols in each zone), to synchronization of only the start and end times of uplink and downlink subframes, and may comprise any other partial synchronization scheme, such as the schemes described herein.

In some embodiments, zone synchronization is defined between a given SBS and its nearest neighbor BSs, since most of the interference typically originates from the nearest neighbors. In a hexagonal cellular network structure (as shown, for example, in FIG. 5 below), each BS has six nearest neighbors. The nearest neighbor BSs are also sometimes referred to as the "$1^{st}$ tier neighbors" of the SBS. In these embodiments, the synchronization information transmitted by a given BS indicates whether this BS is zone-synchronized with its nearest neighbors or not. In alternative embodiments, however, additional BSs can be considered in addition to the nearest neighbors.

Figure 4:
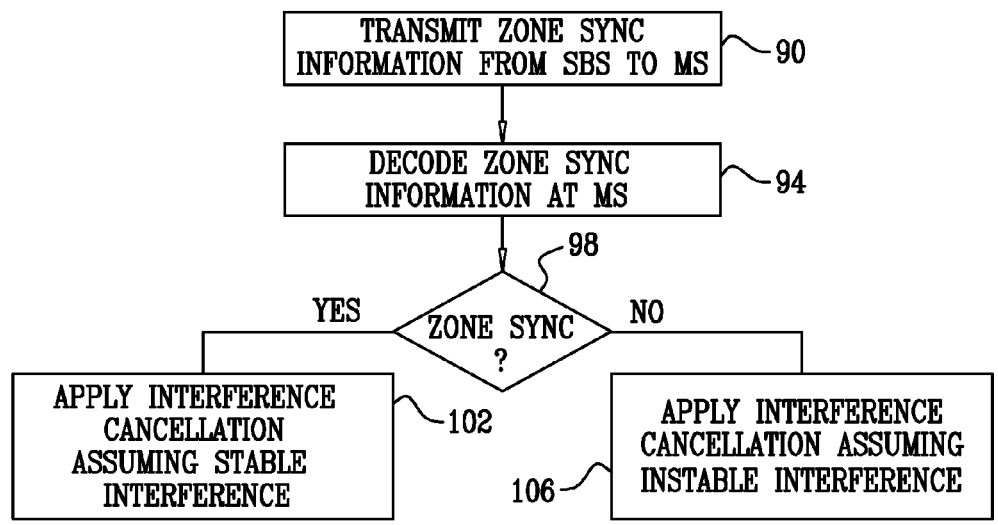
FIG. 4 is a flow chart that schematically illustrates a method for synchronization and interference cancellation in a cellular communication network, in accordance with an embodiment of the present invention.

FIG. 4 is a flow chart that schematically illustrates a method for synchronization and interference cancellation in network 20, in accordance with an embodiment of the present invention. The method of FIG. 4 assumes a scenario in which a certain MS communicates with a SBS, and is subject to interference from one or more other BSs of the network. The method begins with the SBS transmitting synchronization information to the MS, at a synchronization reporting step 90. By sending the synchronization information, the SBS informs the MS whether or not the SBS and the interfering BSs transmit using zones that are time-synchronized with one another. In other words, the SBS notifies the MS whether or not the interference characteristics measured in a given frame can be assumed to remain relatively stable in subsequent frames.

The MS decodes the synchronization information transmitted by the SBS, at a decoding step 94. The MS checks whether the synchronization information indicates that the SBS and interfering BSs are zone-synchronized, at a synchronization checking step 98. If the different BSs can be assumed to be zone-synchronized, the MS applies an interference cancellation technique that assumes stable interference during the zone, at a stable interference cancellation step 102. For example, the MS may estimate the interference in one frame, and apply the estimated interference in a subsequent frame with little or no modification. If, on the other hand, the different BSs cannot be assumed to be zone-synchronized, the MS applies an interference cancellation technique that assumes that interference characteristics are not necessarily stable and may change during the zone, at an instable interference cancellation step 106.

Zone Synchronization in Specified Network Regions

In some embodiments, zone synchronization is implemented only in specific geographical regions of the network rather than across the entire network. Synchronizing BSs in a regional manner enhances the operational flexibility of the network, usually with only small performance degradation around the region boundaries.

Figure 5:
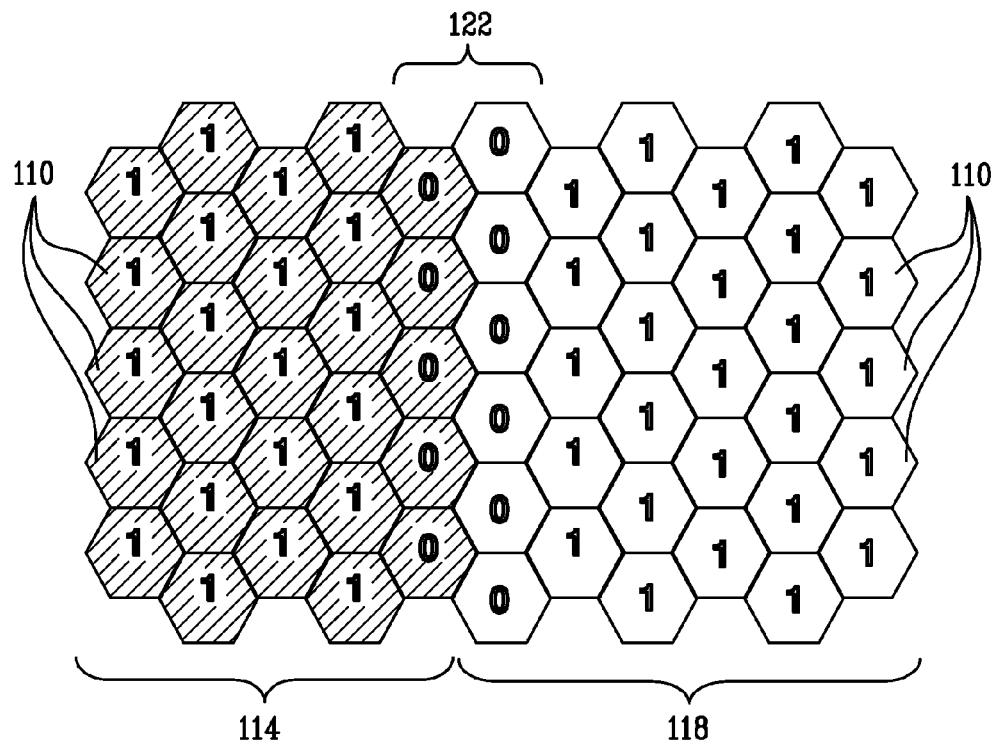
FIG. 5 is a diagram showing a regional synchronization scheme in a cellular communication network, in accordance with an embodiment of the present invention.

FIG. 5 is a diagram showing a regional synchronization scheme in a cellular communication network, in accordance with an embodiment of the present invention. FIG. 5 shows the geographical coverage of a cellular network, which comprises multiple hexagonal cells 110. Each cell 110 corresponds to the coverage area of a certain BS. (The hexagonal network layout of FIG. 5 is chosen purely for the sake of conceptual clarity. In real-life networks, cells 110 usually deviate from an orderly hexagonal grid due to various factors. Nevertheless, the methods and systems described herein can be used with any suitable network layout.)

The network of FIG. 5 is divided into two regions 114 and 118. The BSs within each region are zone-synchronized with one another. The BSs in region 114 are, however, not zone-synchronized with the BSs in region 118. In order to enable MSs to make use of the zone synchronization, some of the BSs are configured to notify the MSs that they are zone-synchronized with their $1^{st}$-tier neighbors, while other BSs are configured to report that they are not zone-synchronized.

In FIG. 5, cells whose BS reports that it is zone-synchronized with its $1^{st}$-Tier neighbors are marked with "1", and cells whose BS reports that it is not zone-synchronized are marked with "0". Typically, BSs that are located on the perimeter of a region report that they are not zone-synchronized with their neighbors, whereas BSs that are located in the interior of a region report that they are zone synchronized. For example, the BSs located in a boundary area 122 between regions 114 and 118 report "0", i.e., that they are not zone-synchronized.

Note that the synchronization information transmitted to MSs by a given BS does not always reflect true status of the BS. Specifically, each BS around the region perimeter (e.g., the BSs in boundary area 122) is zone-synchronized with the other BSs in its respective region. Nevertheless, these BSs report "0", i.e., report that they are not zone-synchronized as they are not synchronized with all their $1^{st}$-Tier neighbor BSs.

Thus, a MS communicating with a BS in the interior of a region can enjoy the benefits of zone synchronization and achieve enhanced interference cancellation. A MS whose SBS is located in a boundary region cannot assume zone synchronization and will typically achieve a lower level of interference cancellation.

The embodiment shown in FIG. 5 is an example, which was chosen purely for the sake of conceptual clarity. In alternative embodiments, regional zone synchronization can be implemented in a single region having a specified perimeter, or in any desired number of regions.

Synchronization Information Reporting Mechanisms

BSs may report the synchronization information to MSs in various ways. Typically, the synchronization information is specified in one or more dedicated fields, e.g., Boolean flags or Type-Length Value (TLV) fields, in one or more downlink messages that are sent from the BSs to the MSs. In some embodiments, the SBS transmits the synchronization information to a given MS when the MS initially establishes communication with the SBS, or from time to time in system messages that report network properties. The MSs receive these system messages and extract the synchronization information conveyed in the messages.

Additionally or alternatively, the SBS may transmit synchronization information to the MS at periodic time intervals, e.g., on a frame-by-frame basis. One-time or occasional transmission of synchronization information has the advantage of incurring only a small amount of link overhead, but is relatively rigid. Periodic transmissions, on the other hand, use more link resources but offer a higher degree of flexibility. Hybrid solutions, e.g., schemes in which the synchronization information is transmitted both at initial link setup and also at periodic intervals, are also feasible.

In some embodiments, the SBS transmits the synchronization information to the MSs in the FCH/MAP messages at the beginning of each frame (e.g., MAP message 76 in FIG. 3 above). In some embodiments, the SBS transmits the synchronization information (e.g., a synchronized/non-synchronized flag) as part of the zone definition in the FCH/MAP messages or in consecutive zone definition information elements. The MSs communicating with the SBS decode the FCH/MAP or zone switch messages and extract the synchronization information conveyed therein.

For example, the following table shows an example of a FCH message, which notifies the MS that the first default PUSC zones of neighboring BSs are synchronized with one another:

| Syntax | Size (bits) | Remarks |
|---|---|---|
| DL_Frame_ Prefix_ format( ) { | — | — |
| Used subchannel bitmap | 6 | Bit #0: Subchannel group 0<br>Bit #1: Subchannel group 1<br>Bit #2: Subchannel group 2<br>Bit #3: Subchannel group 3<br>Bit #4: Subchannel group 4<br>Bit #5: Subchannel group 5 |
| Synchronized _Zone | 1 | If 1: During the duration of the default PUSC zone, all first tier BSs will also be in the default PUSC zone |
| Repetition_ Coding_ Indication | 2 | 0b00: No repetition coding on DL-MAP<br>0b01: Repetition coding of 2 used on DL-MAP<br>0b10: Repetition coding of 4 used on DL-MAP<br>0b11: Repetition coding of 6 used on DL-MAP |
| Coding_ Indication | 3 | 0b000: CC encoding used on DL-MAP<br>0b001: BTC encoding used on DL-MAP<br>0b010: CTC encoding used on DL-MAP<br>0b011: ZT CC encoding used on DL-MAP<br>0b100: CC encoding with optional interleaver<br>0b101: LDPC encoding used on DL-MAP<br>0b110 to 0b111: Reserved |
| DL-Map_Length | 3 | — |
| Reserved | 4 | Shall be set to zero |
| } | | |

In some network configurations, the MSs measure and report the downlink Carrier to Interference and Noise Ratio (CINR) to the SBS. The reported CINR may comprise, for example, the Physical CINR (PCINR) or the Effective CINR (ECINR), as defined in the IEEE 802.16 standard. These reports are used, for example, for link adaptation, i.e., for selecting the appropriate modulation scheme and coding rate. The SBS may request a given MS to report the CINR measured in a given zone. CINR reporting may be enabled and disabled by the SBS.

In some embodiments of the present invention, MSs 28 report their CINR status to the SBS while taking into account the interference mitigation capabilities of the terminal. Since the interference cancellation capability of the MS may depend on the presence or absence of zone synchronization, the MS typically computes the CINR it reports to the SBS based on the synchronization information it receives from the SBS.

In some network configurations, the MS and SBS report their capabilities to one another when the MS initially registers with the SBS. In some embodiments, a given MS may publish its interference cancellation capabilities to the SBS during the capabilities exchange process. This mechanism enables the SBS to determine whether zone synchronization is expected to contribute to system performance. Based on this information, the SBS can decide whether to activate or deactivate zone synchronization, so that the link overhead associated with zone synchronization will be allocated only when it is expected to be effective.

Moreover, using the published MS capabilities, the SBS can allocate resources to some MSs in synchronized zones, and to other MSs in non-synchronized zones. Typically, MSs that are expected to improve their interference cancellation performance as a result of zone synchronization will be allocated resources in the synchronized zones, and vice versa.

For example, the following TLV field definition can be used for reporting the interference cancellation capabilities of an IEEE 802.16 MS in the different zones:

| Type | Length | Value | Scope |
|---|---|---|---|
| | 1 | Bit #0: Support interference cancellation for non-STC PUSC<br>Bit #1: Support interference cancellation for STC PUSC Mat A<br>Bit #2: Support interference cancellation for STC PUSC Mat B<br>Bit #3: Support interference cancellation for AMC<br>Bit #4: Support interference cancellation for FUSC<br>Bit #5: Reserved<br>Bit #6: Reserved<br>Bit #7: Reserved | SBC-REQ<br>SBC-RSP |

Although the embodiments described herein mainly address zone synchronization in IEEE 802.16 networks, the principles of the present invention can also be used in various other network types.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A communication terminal, comprising:
a Radio Frequency (RF) unit, which is operative to receive signals at least from a Serving Base Station (SBS) that serves the terminal in a wireless communication network; and
a baseband processor, which is configured to receive from the SBS via the RF unit a downlink message comprising a field, in which the SBS specifies to the terminal an extent of synchronization between the SBS and at least one other Base Station (BS) of the wireless communication network, and to process the received signals, responsively to the extent of the synchronization specified in the field of the downlink message, so as to cancel interference signals transmitted by the at least one other BS,
wherein the signals received from the SBS comprise a sequence of time frames including zones, and
wherein the field in the received downlink message indicates that the SBS and the at least one other BS are zone synchronized with one another.

2. The terminal according to claim 1, wherein the field indicates a degree of overlap between pilot symbols transmitted by the SBS and by the at least one other BS, and wherein the baseband processor is configured to estimate the interference based on the degree of overlap.

3. The terminal according to claim 1, wherein the baseband processor is configured to apply a first interference cancellation process when the field indicates that the SBS and the at least one other BS are synchronized with one another, and to apply a second interference cancellation process, different from the first interference cancellation process, otherwise.

4. The terminal according to claim 1, wherein, when the field indicates that the SBS and the at least one other BS are synchronized with one another, the baseband processor is configured to compute an estimate of the interference in a first time frame of the signals, and to cancel the interference, using the estimate, in a second time frame later than the first time frame.

5. The terminal according to claim 1, wherein the baseband processor is configured to compute an estimate of the interference in a first time frame of the signals, and to select, using the estimate, one or more link adaptation parameters for a second time frame later than the first time frame, only when the field indicates that the SBS and the at least one other BS are synchronized with one another.

6. The terminal according to claim 1, wherein the signals received from the SBS comprise a sequence of time frames, and wherein the baseband processor is configured to receive the downlink message periodically in at least some of the time frames.

7. The terminal according to claim 1, wherein the baseband processor is configured to receive the downlink message in a system message.

8. The terminal according to claim 1, wherein the baseband processor is configured to receive the downlink message upon initiating communication with the BS.

9. The terminal according to claim 1, wherein the at least one other BS comprises one or more nearest-neighbors of the SBS in the wireless communication network.

10. The terminal according to claim 1, wherein the baseband processor is configured to measure a Carrier to Interference and Noise ratio (CINR) of the received signals, to compute a reported value of the CINR responsively to the extent of the synchronization, and to send the reported value of the CINR to the SBS.

11. The terminal according to claim 1, wherein the baseband processor is configured to send a capabilities message to the SBS, so as to indicate to the SBS whether the terminal supports an interference cancellation mechanism that depends on the extent of the synchronization.

12. The terminal according to claim 1, wherein the signals received from the SBS comprise multiple time intervals, and wherein the field specifies the extent of the synchronization only for a partial subset of the time intervals.

13. A Base Station (BS), comprising:
a Radio Frequency (RF) unit, which is operative to transmit signals to a communication terminal over a wireless communication network; and
a baseband processor, which is configured to produce a downlink message comprising a field that specifies to the communication terminal an extent of synchronization between the BS and at least one other BS in the wireless communication network, and to send the downlink message via the RF unit to the communication terminal,
wherein the signals transmitted from the BS comprise a sequence of time frames including zones, and
wherein the field in the produced downlink message indicates whether the SBS and the at least one other BS are zone synchronized with one another.

14. A wireless communication system, comprising:
one or more first base stations, which are located in a predefined geographical region; and
one or more second base stations, which are located outside the predefined geographical region,
wherein the first base stations are synchronized with one another but are not synchronized with the second base stations, and wherein each base station from among the first base stations is configured to transmit to communication terminals in the network a downlink message comprising a field indicating an extent of synchronization between the base station and at least one neighboring base station,
wherein the field in the transmitted downlink message indicates whether the base station and the at least one neighboring base station are zone synchronized with one another.

15. The system according to claim 14, wherein a given base station that is located in a perimeter of the predefined geographical region is configured to transmit the downlink message indicating that the given base station and the base stations that neighbor the given base station are not synchronized with one another.

16. A method for communication, comprising:
in a communication terminal, receiving signals at least from a Serving Base Station (SBS) that serves the terminal in a wireless communication network;
receiving from the SBS a downlink message comprising a field, in which the SBS specifies to the terminal an extent of synchronization between the SBS and at least one other Base Station (BS) of the wireless communication network; and
processing the received signals, responsively to the extent of the synchronization specified in the field of the downlink message, so as to cancel interference caused to the signals received from the SBS by signals transmitted by the at least one other BS,
wherein the signals received from the SBS comprise a sequence of time frames including zones, and
wherein the field in the downlink message indicates whether the SBS and the at least one other BS are zone synchronized with one another.

17. The method according to claim 16, wherein receiving the signals comprises receiving from the SBS a sequence of time frames including zones, and wherein processing the signals comprises, when the field indicates that the SBS and the at least one other BS are synchronized with one another, canceling the interference under an assumption that start times of the zones of the time frames are synchronized between the SBS and the at least one other BS.

18. The method according to claim 16, wherein the field indicates a degree of overlap between pilot symbols transmitted by the SBS and by the at least one other BS, and wherein processing the signals comprises estimating the interference based on the degree of overlap.

19. The method according to claim 16, wherein processing the signals comprises applying a first interference cancellation process when the field indicates that the SBS and the at least one other BS are synchronized with one another, and applying a second interference cancellation process, different from the first interference cancellation process, otherwise.

20. The method according to claim 16, wherein processing the signals comprises, when the field indicates that the SBS and the at least one other BS are synchronized with one another, computing an estimate of the interference in a first time frame of the signals, and canceling the interference, using the estimate, in a second time frame later than the first time frame.

21. The method according to claim 16, wherein processing the signals comprises, when the field indicates that the SBS and the at least one other BS are synchronized with one another, computing an estimate of the interference in a first time frame of the signals, and selecting, using the estimate, one or more link adaptation parameters for a second time frame later than the first time frame.

22. The method according to claim 16, wherein receiving the signals comprises receiving from the SBS a sequence of time frames, and wherein receiving the downlink message comprises receiving the downlink message periodically in at least some of the time frames.

23. The method according to claim 16, wherein receiving the downlink message comprises receiving the downlink message in a system message.

24. The method according to claim 16, wherein receiving the downlink message comprises receiving the downlink message upon initiating communication with the BS.

25. The method according to claim 16, wherein the at least one other BS comprises one or more nearest-neighbors of the SBS in the wireless communication network.

26. The method according to claim 16, wherein processing the signals comprises measuring a Carrier to Interference and Noise ratio (CINR) of the received signals, computing a reported value of the CINR responsively to the extent of the synchronization, and comprising sending the reported value of the CINR to the SBS.

27. The method according to claim 16, and comprising sending a capabilities message to the SBS, so as to indicate to the SBS whether the terminal supports an interference cancellation mechanism that depends on the extent of the synchronization.

28. The method according to claim 16, wherein the signals received from the SBS comprise multiple time intervals, and wherein the field specifies the extent of the synchronization only for a partial subset of the time intervals.

29. A method for communication, comprising:
transmitting signals from a Base Station (BS) over a wireless communication network to a communication terminal;
producing a downlink message comprising a field that specifies to the communication terminal an extent of synchronization between the BS and at least one other BS in the wireless communication network; and
sending the downlink message in the signals transmitted to the communication terminal,
wherein the field in the produced downlink message indicates whether the BS and the at least one other BS are zone synchronized with one another.

30. A method for communication, comprising:
operating one or more first base stations, which are located in a predefined geographical region, and one or more second base stations, which are located outside the predefined geographical region, so as to communicate with communication terminals;
synchronizing the first base stations with one another but not with the second base stations; and
transmitting from each base station from among the first base stations to the terminals a downlink message comprising a field indicating an extent of synchronization between the base station and at least one neighboring base station,
wherein the field in the transmitted downlink message indicates whether the base station and the at least one neighboring base station are zone synchronized with one another.

31. The method according to claim 30, and comprising transmitting from a given base station that is located in a perimeter of the predefined geographical region the downlink message indicating that the given base station and the base stations that neighbor the given base station are not synchronized with one another.

* * * * *